No. 829,348. PATENTED AUG. 21, 1906.
C. F. NELMS.
PEANUT STEMMER.
APPLICATION FILED DEC. 14, 1905.
2 SHEETS—SHEET 1.
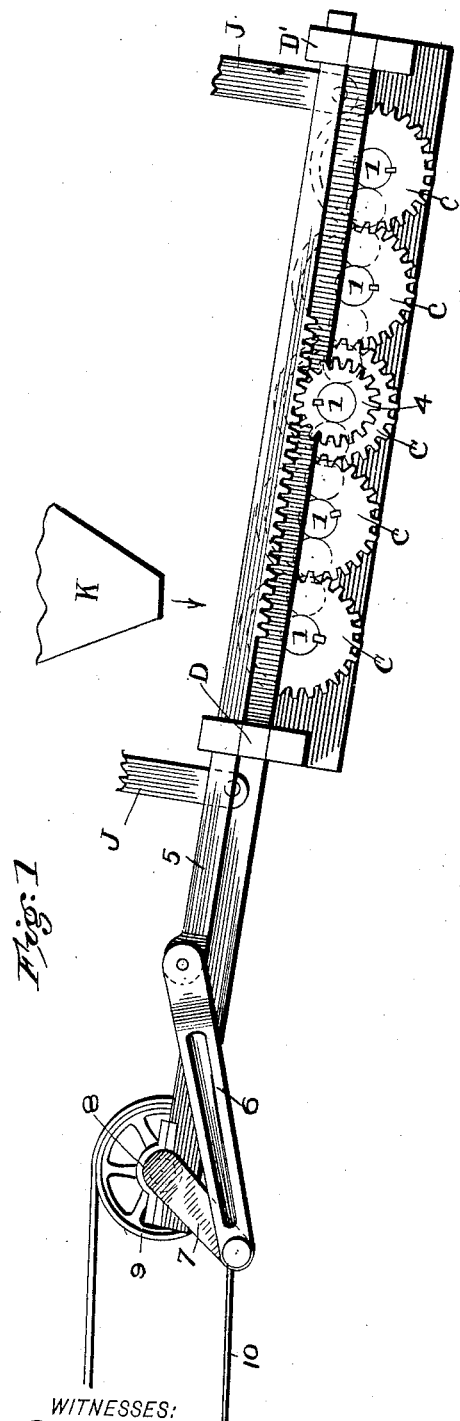
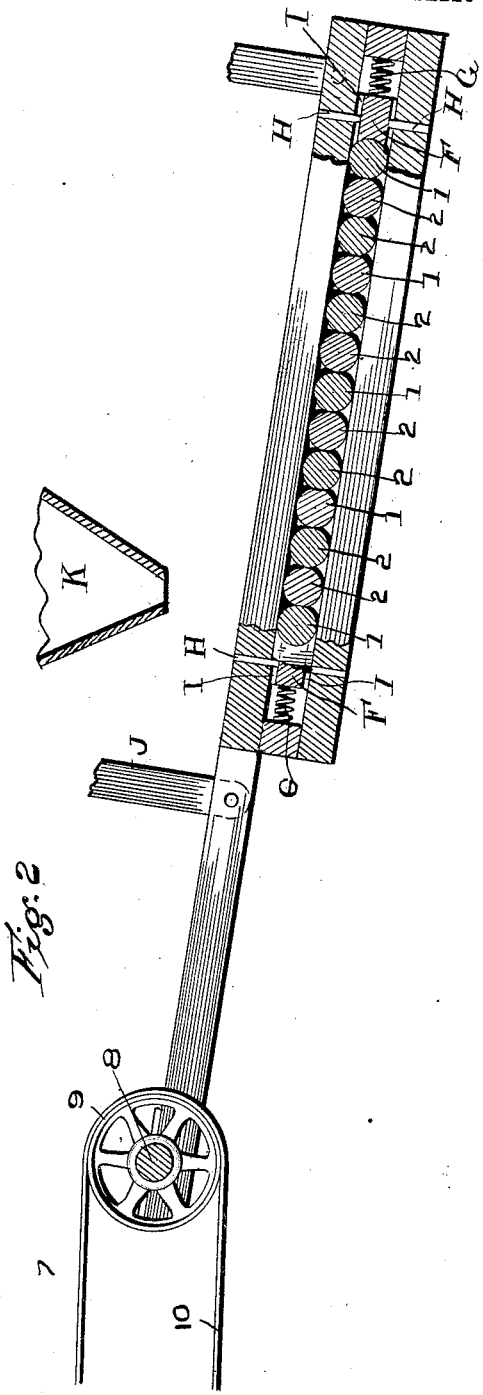
WITNESSES:
INVENTOR
CHARLES F. NELMS
BY
ATTORNEYS No. 829,348. PATENTED AUG. 21, 1906.
C. F. NELMS.
PEANUT STEMMER.
APPLICATION FILED DEC. 14, 1905.
2 SHEETS—SHEET 2.
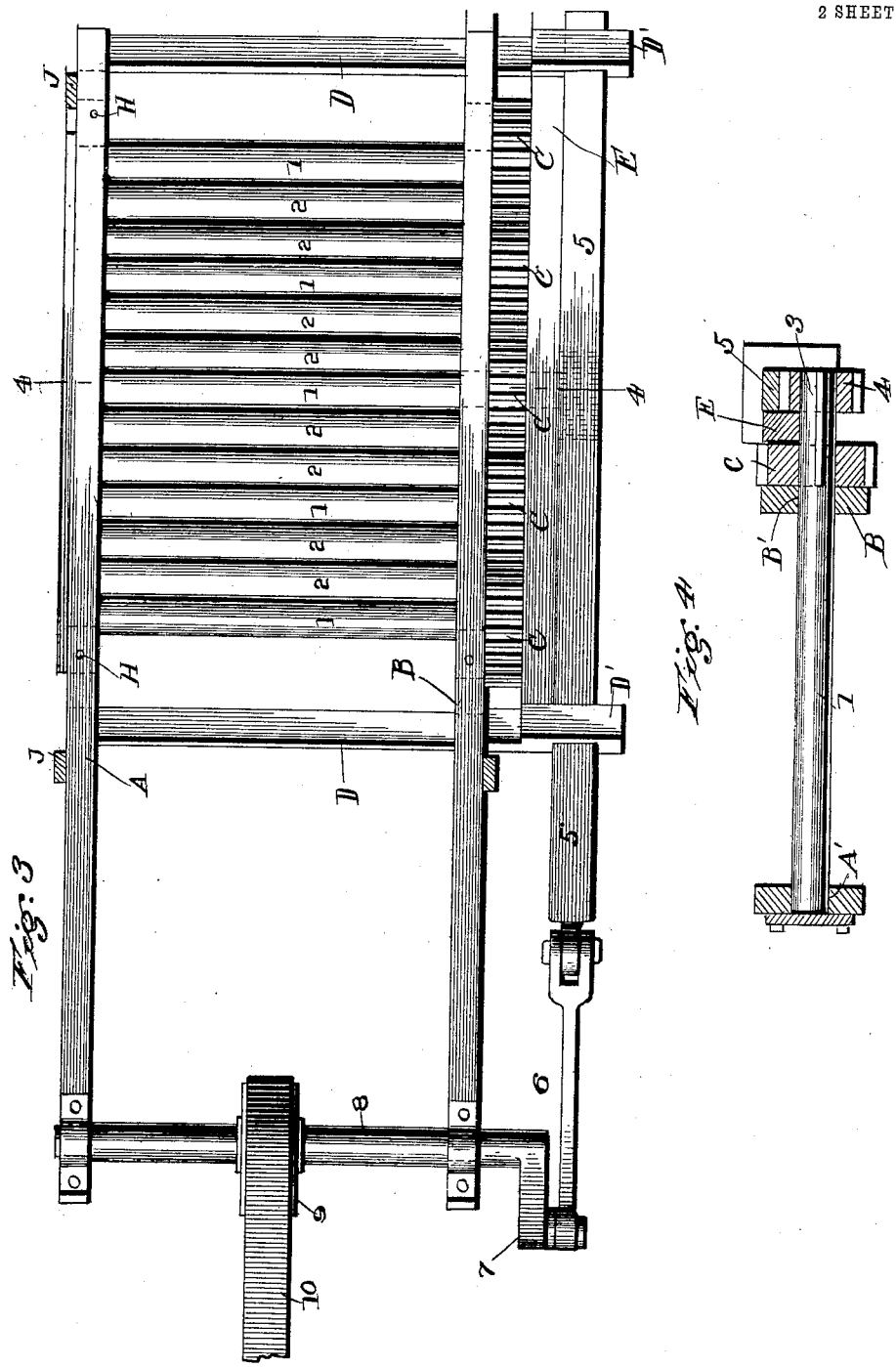
WITNESSES:
INVENTOR
CHARLES F. NELMS
BY
ATTORNEYS

UNITED STATES PATENT OFFICE.

CHARLES FRANK NELMS, OF SMITHFIELD, VIRGINIA, ASSIGNOR TO NORFOLK STORAGE COMPANY, OF NORFOLK, VIRGINIA, A CORPORATION OF VIRGINIA.

PEANUT-STEMMER.

No. 829,348.  Specification of Letters Patent.  Patented Aug. 21, 1906.

Application filed December 14, 1905. Serial No. 291,796.

*To all whom it may concern:*

Be it known that I, CHARLES FRANK NELMS, a citizen of the United States, and a resident of Smithfield, in the county of Isle of Wight and State of Virginia, have invented certain new and useful Improvements in Peanut-Stemmers, of which the following is a specification.

My invention is an improvement in peanut-stemmers; and it consists in certain novel constructions and combinations of parts, as will be hereinafter described and claimed.

In the drawings, Figure 1 is a side elevation, and Fig. 2 a vertical longitudinal section, of a machine embodying my invention. Fig. 3 is a top plan view thereof, and Fig. 4 is a cross-section on about line 4 4 of Fig. 3.

In carrying out my invention, I employ a suitable frame comprising side bars A and B, and in this frame I journal a series of parallel rollers arranged in sets of four, the rollers 1 1 of the several sets being geared together and the intermediate rollers 2 between the rollers 1 1 being idlers and being revolved by friction with each other and with the geared rollers, as will be understood from the following description of the invention.

In supporting the rollers the bar A is provided in its inner face with a longitudinal groove A′, in which the rollers 1 and 2 rest at one end, and the opposite side bar B is slotted longitudinally at B′, and the rollers 2 journal at their ends in the said slot, while the rollers 1 journal in the slot B′ and extend laterally beyond the bar B to receive the gears C, by which the rollers 1 are geared together, one of the rollers 1 being extended at 3 to receive the pinion 4, which is meshed with a reciprocating rack-bar 5, by which the rollers 1 are positively operated in the use of the invention.

The reciprocating bar 5 is guided in the extended ends D′ of the cross-bars D, which latter extend between the side bars A and B and beyond the same, as shown, and a bar E extends longitudinally between the extensions D′ and alongside the reciprocating bar 5 and spaces the same properly away from the gears C and operates to hold the said gears in position to mesh properly with each other in the use of the invention. The bar 5 is connected by a pitman 6 with a crank 7 on a cross-shaft 8, supplied with a pulley 9, which may be driven by a belt 10 or any other suitable means.

The shafts 1 and 2 fit loosely within their bearings in the opposite side bars A and B and are pressed toward each other by the spring-actuated blocks F, actuated by the springs G and guided by the pins H, projecting from the frame-bars A and B into the longitudinal grooves 1 in their respective blocks, as will be understood from Fig. 2 of the drawings.

It will be noticed that the adjacent rollers 1 are geared by the gears C and that the rollers 2, Fig. 2, between the rollers 1 will be driven by frictional contact with their adjacent rollers 1, so that in operation when the rollers 1 are turning on their upper faces toward the adjacent rollers 2 the intermediate rollers 2 will be turning away from each other on their upper faces, so that the adjacent pairs of rollers will throughout the series be turning in the opposite direction and that this direction of movement will be reversed from time to time as the bar 5 reciprocates, so that as the peanuts with the stems pass down the inclined bed of rollers the stems will be drawn between the rollers as they turn toward each other and snapped off, and then the rollers will be turned in the reverse direction to pass the nuts onto the next rollers, so that there is a reasonable certainty of the stems being drawn from the peanuts as they traverse the roller-bed. Also this reversing of the movement of the rollers tends to cause agitation of the nuts as they pass down the inclined bed of rollers in such manner as to insure the presentation of the stems to some pair of rollers moving toward each other on their upper faces during the course of the nuts over the roller-bed, so that when the nuts reach the bottom of the stemmer and discharge therefrom they will be freed of stems, as desired.

In practice the frame may be supported by suitable hangers J from the frame of any suitable form of fanning-machine (not shown) and whose discharge-spout K may be arranged to deliver the nuts to the rollers at the upper end of the bed, the frame and bed of rollers being ordinarily arranged at an incline, as shown in Figs. 1 and 2 of the drawings.

It will be noticed that the intermediate rollers 2 of each set of four bear at their ends which fit in the slot B' against the inner faces of the gears C of the adjacent rollers 1 and are held thereby from displacement at said ends in the use of the machine.

Having thus described my invention, what I claim as new, and desire to secure by Letters Patent, is—

1. The peanut-stemmer herein described, comprising the framing having side bars, one of which is grooved longitudinally in its inner face and the other of which is provided with a longitudinal slot in alinement with the groove in the first bar, the rollers supported in said framing and fitting at one end within the groove in one side bar and at their other ends in the slot of the opposite side bar and arranged in sets of fours, the end rollers of the sets being geared together and arranged to operate the two intermediate rollers by frictional contact, one of the geared rollers being extended and provided with a pinion, a reciprocating bar meshing with said pinion, and spring-actuated blocks for pressing the rollers toward each other, substantially as set forth.

2. The combination in a machine for stemming peanuts, of the frame, a series of rollers supported therein and arranged in sets of fours, comprising two intermediate idler-rollers and two end rollers geared together, and means for communicating an oscillating motion to one of the geared rollers, substantially as set forth.

3. The combination in a machine for stemming peanuts, of the frame, rollers journaled therein and arranged in sets of fours, and means whereby the pairs of adjacent rollers will be repeatedly operated toward each other and then in a reverse direction, substantially as set forth.

4. The combination of the frame having the opposite side bars, the rollers journaled in the side bars and arranged in sets of fours with the fourth rollers provided with gears meshing with each other, and the intermediate rollers bearing frictionally against the said geared rollers and driven frictionally therefrom, whereby the geared rollers when operated will move in reverse directions, and the intermediate rollers will also turn in directions reverse to each other and to the geared rollers with which they contact, and means for giving an oscillating motion to the geared rollers, substantially as set forth.

5. The combination in a peanut-stemmer, of the opposite side bars, the rollers journaled therein and arranged in sets of fours, the fourth rollers being provided with gears meshing together, and the intermediate rollers bearing at one end against the sides of the gears of the adjacent geared rollers, substantially as set forth.

CHARLES FRANK NELMS.

Witnesses:
R. C. BROWNE,
H. F. BELL.